Jan. 13, 1953　　　　　　　L. T. SZADY　　　　　　　2,625,246
ENERGIZING SPRING RETAINER FOR ONE-WAY CLUTCHES
Filed April 23, 1951
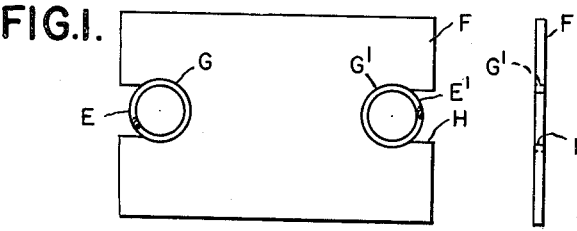
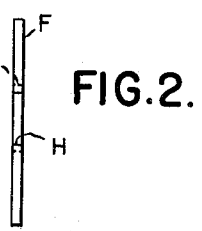
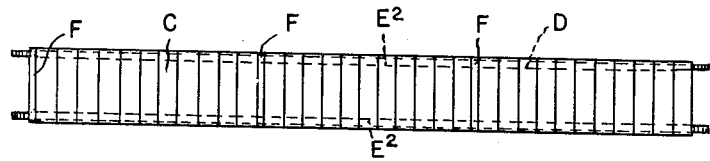
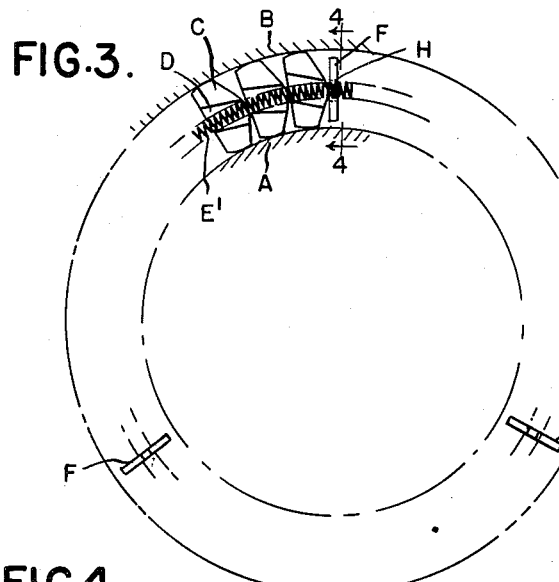
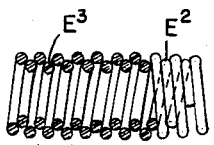
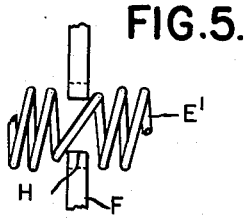
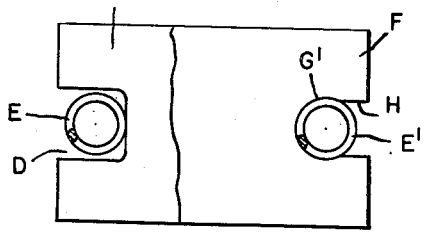
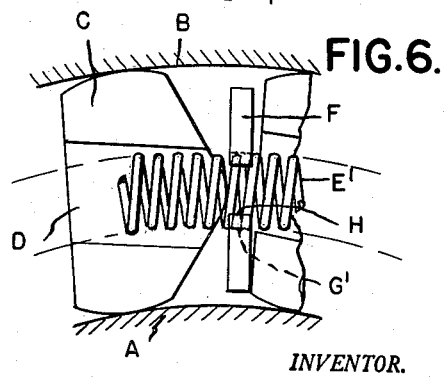
INVENTOR.
LEOPOLD T. SZADY
BY Whittemore Hulbert + Belknap
ATTORNEYS Patented Jan. 13, 1953

2,625,246

UNITED STATES PATENT OFFICE 2,625,246

ENERGIZING SPRING RETAINER FOR ONE-WAY CLUTCHES

Leopold T. Szady, Hamtramck, Mich., assignor to Formsprag Company, Van Dyke, Mich., a corporation of Michigan Application April 23, 1951, Serial No. 222,318

5 Claims. (Cl. 192—45.1)

1

The invention relates to one-way clutches of that type including coaxial spaced cylindrical raceways, a series of sprags therebetween having channels at one or both ends thereof and a garter spring or garter springs for engaging said channels to energize the sprags and hold the same in frictional contact with the raceways. The location of these channels in the ends of the sprags facilitates engagement of the garter springs therewith, but it is necessary to provide some means for holding the springs against accidental displacement from the channels. This is accomplished in certain constructions of sprags by forming undercut channels so that the tension of the spring will hold it in this undercut portion and prevent accidental disengagement. The undercutting of the channels complicates the manufacture of the sprags, and furthermore as the channels have parallel sides only one side is thus undercut. Sprags may be energized alternatively by radially contracting and radially expanding garter springs. However the same sprags cannot be used with these alternative constructions of garter springs as the undercutting of the channels will only retain the one construction.

It is the object of the instant invention to obtain a construction of retainer for the garter springs which will dispense with the necessity of undercutting the channels in the sprags.

It is a further object to obtain a construction in which a series of sprags and energizing springs therefor are held intact to form a unit for subsequent insertion in a one-way clutch.

With these objects in view the invention consists in the construction as hereinafter set forth.

In the drawings:

Fig. 1 is a side elevation and Fig. 2 an end elevation of the energizing spring retainer;

Fig. 3 is an elevation of a one-way clutch showing a plurality of energizing spring retainers in engagement therewith;

Fig. 4 is an enlarged cross section substantially on line 4—4, Fig. 3;

Fig. 5 is an elevation illustrating the manner of engaging the spring with the retainer;

Fig. 6 is an enlarged elevation of a portion of Fig. 3;

Fig. 7 is a plan view of a rectilinear series of sprags and energizing springs therefor held intact by a plurality of retainers;

Fig. 8 illustrates the connecting means between ends of the retainer springs of Fig. 7 when the series is bent into annular form for engagement with the spaced raceways of the one-way clutch.

As shown in Fig. 3, A is the inner race member and B the outer race member of a one-way clutch, these being coaxial and radially spaced from each other. C are the sprags arranged in series between the race members which are provided with channels D in the opposite end portions thereof for receiving energizing garter springs E'. Instead of making the channels D with one side undercut, both sides may be parallel to each other and to the longitudinal axis of the sprag. Such construction would not, however, retain the garter springs when placed in the channels.

My improved retainer comprises a thin plate F which may be placed between a pair of adjacent sprags within the space between the inner and outer raceways and extending the entire length of the sprags. The opposite ends of this plate are provided with apertures G and G' of a diameter to hold the garter springs, and which have entrance slots H of smaller diameter from the end of the plate. One or a plurality of the retainers F may be used in a clutch; preferably three which are equispaced around the annular raceways. After the positioning of the retainers in the series of sprags, the garter springs E may be placed in the channels D and simultaneously engaged with the retainers F. Such engagement is effected by distorting one or more convolutions of the spring to extend at a more oblique angle and to pass through the entrance slot H into engagement with the aperture G as shown in Fig. 5. When released from distortion the spring will assume the position shown in Fig. 6, where it will be held from disengagement from the aperture G. Thus the member F forms a tie connection between the two garter springs E and E' at opposite ends of the series of sprags and holds them in engagement with the channels D.

Instead of first assembling an annular series of sprags in connection with the raceways and then engaging the garter springs and retainers therewith, a rectilinear assembly of these elements may be formed which will remain intact and can be inserted as a unit between the raceways. This is illustrated in Fig. 7 and as there shown, the garter springs E² are rectilinear engaging the channels D of a rectilinear series of sprags and having a plurality of retainers F at distributive points in the series. To place this assembly in engagement with the race members, it is first bent into annular form and the opposite ends of the springs E² are connected to each other. Such connection may be made in any suitable way such as by the use of a splice spring E³ of slightly smaller diameter, which is threaded within the convolutions of the spring E² to bridge the joint between the opposite ends thereof.

While I have specifically illustrated a construction of one-way clutch in which three retainers are used, it is obvious that the number of the retainers depends to some extent on the number of sprags in the series. The number in the illustrated construction is 32 sprags but for a larger number, such as 52, it may be desirable to use seven retainers. Also for a smaller series less than three retainers may be used, or even a single retainer might be useful in some constructions.

What I claim as my invention is:

1. In a one-way clutch including coaxial radially spaced annular raceways, a series of sprags therebetween, and a garter spring for energizing said sprags engaging open end channels therein; means for retaining said springs in said channels comprising a thin plate arranged between adjacent sprags having an aperture therein at one end thereof registering with said channels through which said spring passes and by which it is held from disengagement from said channels said plate being anchored against movement in the plane thereof.

2. The construction as in claim 1 having a pair of garter springs engaging channels at opposite ends of the sprags, the said thin plate having a pair of apertures in opposite end portions thereof registering with the channels at opposite ends of the sprags and constituting a tie member between the pair of springs said springs anchoring said plate and through the latter anchoring each other.

3. The construction as in claim 1 in which the aperture in said plate has an entrance slot of lesser width through the end of the plate through which said spring can be passed by a temporary distortion of a convolution thereof.

4. A sprag assembly for insertion as a unit into engagement with the cooperating raceways of a one-way clutch, comprising a rectilinear series of transversely extending sprags, said sprags having channels in the opposite ends thereof, a pair of rectilinear coil springs engaging respectively the channels at the opposite ends of said sprags, and a tie connection between said springs arranged between adjacent sprags at one or more points in the series, the ends of each of said springs being adapted for connection with each other to form an annulus of the assembly.

5. The construction as in claim 4 having a plurality of tie connections distributed along the series, each tie connection being formed of a thin plate having apertures in opposite end portions thereof with entrance slots through the ends of the plate through which said springs may be passed by the temporary distortion of convolutions thereof.

LEOPOLD T. SZADY.

REFERENCES CITED

The following references are of record in the file of this patent:

UNITED STATES PATENTS

| Number | Name | Date |
|---|---|---|
| 2,364,280 | Dodge | Dec. 5, 1944 |
| 2,389,961 | Dodge | Nov. 27, 1945 |